和合国 Patent Office 3,441,432
Patented Apr. 29, 1969

3,441,432
METHOD OF RENDERING GLASS SURFACES ABRASION AND SCRATCH RESISTANT
Leon Levene, Toledo, Ohio, assignor to Owens-Illinois, Inc., a corporation of Ohio
No Drawing. Filed Aug. 19, 1965, Ser. No. 481,066
Int. Cl. C03c *17/30*
U.S. Cl. 117—124                15 Claims

ABSTRACT OF THE DISCLOSURE

Abrasion and scratch resistant glass surfaces, particularly glass containers, are produced by applying to the glass surface a bis(trialkylsiloxy) titanium oxide wherein the alkyl group contains from 1 to 12 carbon atoms while the glass surface is at a temperature below the pyrolyzing temperature of the coating material. Preferably the titanium compound is dissolved in an inert organic solvent. Glass containers and other glass surfaces treated in accordance with the foregoing method have formed thereon a thin, tightly adhering, transparent and substantially colorless coating.

---

The present invention relates to the treatment of glass surfaces which may become subjected to abrasive or rubbing contact with each other and other objects and surfaces in the course of various manufacturing and handling operations. More particularly, the present invention relates to a method of treating glass surfaces in order to impart abrasion and scratch resistance thereto. In a further aspect, the present invention relates to the treatment of glass containers which are subjected to abrasive contact in handling, filling and packaging operations, in order to impart abrasion and scratch resistance to such glass containers.

As is generally accepted and recognized, the strength of glass depends upon the surface being free of scratches, flaws, crevices and the like. When present on a glass surface, these scratches considerably decrease the strength of the glass down to as little as one-fourth of the original value. Manufactured glass articles develop their maximum strength very shortly after they are formed, and the strength characteristics rapidly diminish as the glass surface comes in contact with other glass surfaces and is particularly deleteriously affected when scratched or abraded in the course of various manufacturing operations.

This problem is particularly acute in the glass container industry where jars, bottles, tumblers and the like come into contact with each other in the course of handling, packaging and shipping of the glassware. In the food and beverage processing field, the containers are often subjected to various processing cycles, including washing, sterilization and vacuum treatments, where the bottles are successively filled, closed and packaged for delivery. In the course of these manufacturing and processing operations, the containers continuously come in contact with each other and various mechanical equipment as they move from station to station, and as a result thereof experience varying degrees of abrasion and impact which adversely affect the strength of the containers. Breakage of bottles during these operations is a serious problem and becomes particularly acute after the containers have been filled with their contents.

To minimize the resulting scratching and abrasion of the glass surfaces during these manufacturing and processing operations, numerous attempts have been made in the past to coat the exterior surfaces of the glass containers with lubricant compositions.

Many of such coating operations require treatment of the glass surface immediately after the glass article leaves the glass forming machine when the surface of the glass is at an extremely high temperature. Several coating compositions of the "hot-end" type have been used commercially and impart satisfactory scratch-resistant properties to glass containers. However, these coatings are applied to a hot glass surface in order to form a satisfactory protective coating. It would be desirable to obtain compositions which do not require application at high temperatures and which could be applied to the glass articles after they have cooled down to about room temperature and which at the same time provide good scratch and abrasion resistance.

Accordingly, it is an object of the present invention to provide a method for imparting abrasion and scratch-resistant coatings on glass surfaces while avoiding the necessity of operating at extremely high temperatures and to avoid the shortcomings and disadvantages of prior known methods and compositions.

It is a further object of the present invention to provide protectively coated glassware having a thin, substantially transparent coating on the glass surfaces subjected to abrasion and which coating is highly resistant to abrasion, while simultaneously maintaining the strength characteristics of the glass.

It is a further object of the present invention to provide a method for coating glass surfaces at relatively low temperatures to impart scratch resistance thereto and avoid the operation of coating apparatus at high temperatures.

It is a still further object of the present invention to provide a method for coating glass surfaces with a lubricious coating at relatively low temperature and thereby provide an abrasion and scratch-resistant coating on the glass surfaces, and avoid the shortcomings of prior methods and compositions.

It is a further object of the present invention to provide a method for coating glass containers with a lubricant coating to impart improved scratch and abrasion resistance.

It is a further object of the present invention to provide a method for imparting scratch and abrasion resistance to glass containers while avoiding the need for applying such coatings at excessively high temperature.

It is a further object of the present invention to provide a method for imparting scratch and abrasion resistance to glass surfaces at the cold end of the article-forming process.

It is a further object of the present invention to provide a method for imparting scratch and abrasion resistance to glass containers at the cold end of the manufacturing operation.

Still another object of the present invention is to provide glassware having a tightly-adhering, thin, substantially colorless and transparent coating on its surface, which coating imparts increased strength and abrasion resistance to tthe ware, enabling it to withstand greater internal pressures without breakage.

In attaining the above objects, one feature of the present invention resides in treating a glass surface at ambient temperature with a coating composition to impart scratch and abrasion resistance to the glass surface.

A further feature of the present invention resides in treating formed glass containers at ambient temperature with a lubricant coating which improves the scratch and abrasion resistance of the containers.

A further feature of the present invention resides in applying to glass surfaces a bis(trialkylsiloxy)titanium oxide to form a scratch and abrasion resistant coating on the glass container.

A further feature of the present invention resides in a one-shot cold end treatment for glassware to improve the scratch resistance of the glassware by application of a bis(trialkylsiloxy)titanium oxide at ambient temperature thereby avoiding the necessity of application of protective coatings at high temperatures.

The above and other objects, features and advantages of the present invention will become apparent from the following detailed description thereof.

According to the present invention, a glass surface of an article of manufacture such as a glass sheet or container, e.g. bottle, jar, tumbler, and the like, is formed in a glass-forming machine and thereafter conveyed to an annealing lehr, as is customary practice and known in the art. At the "cold end" of the annealing lehr, or at any time thereafter, the glass surface is treated with an organic titanium oxide containing silicon, whereupon a highly lubricious, scratch-resistant coating is imparted to the glass surface. Although the process of the present invention is referred to as a "cold end" treatment it is to be understood that the temperature of the glass can range from ambient or room temperature up to several hundred degrees Fahrenheit; e.g. 300° F. Generally, it is preferred to carry it out at ambient temperature.

The organic titanium oxide containing silicon compounds suitable for purposes of the present invention are those which upon contact with the glass surface will form a substantially colorless, transparent layer or coating which is tightly adherent to the surface of the glass, and which has an average thickness of up to several microns.

The titanium compounds preferred for the purposes of the present invention are bis-trialkylsiloxy titanium oxides wherein the alkyl group contains from 1 to 12 carbon atoms. The preferred compounds for the present invention are those wherein the alkyl group contains from 2 to 6 carbon atoms. Suitable examples are bis-trimethylsiloxy titanium oxide, bis-triethylsiloxy titanium oxide, and bis-trihexylsiloxy titanium oxide.

According to the procedure of the present invention, the bis(trialkylsiloxy)titanium oxide is mixed in an inert volatile organic solvent such as benzene, heptane, xylene and the like, and is sprayed onto the glass surface. The solution of the compound may be applied to the glass surfaces in any convenient manner; e.g. spraying, dipping, etc. The coatings which form on the glass surface are uniform, clear and extremely lubricious and provide excellent scratch resistance. As noted, various inert organic solvents can be used and the concentration of the bis(trialkylsiloxy)titanium oxide can range from approximately 0.5% to about 10%. However, excellent results have been obtained using as little as 1% of the bis(trialkylsiloxy)titanium oxide compound.

The following example is illustrative of the present invention and is not considered limiting thereof in any way.

Example 1

Bis(triethylsiloxy)titanium oxide was prepared in the following manner: Triethylsilanol in an amount of 26.4 grams (0.2 M) in dried m-xylene (55 ml.) was added slowly with stirring at room temperature to freshly distilled tetraisopropyltitanate (28.4 grams, 0.1 ml.) in dried m-xylene (150 ml.). Distillation under vacuum (1 mm.) brought over a quantitative yield of isopropyl alcohol. The vacuum was broken and a clear solution was observed. Water was added in the amount of 1.8 grams (0.1 mole) in isopropyl alcohol (50 g.) very slowly with stirring at room temperature. The solvents were then removed under vacuum at very low heat, leaving a viscous clear liquid which was shown to be bis(triethylsiloxy) titanium oxide.

A 1% solution of bis(triethylsiloxy)titanium oxide in benzene was sprayed onto glass containers which were at room temperature. The coatings were tested and proved to provide excellent scratch resistance to the sprayed surfaces.

What is claimed is:

1. A method for imparting abrasion and scratch resistance to glass surfaces, comprising applying to said surface a bis(trialkylsiloxy)titanium oxide compound wherein the alkyl group contains from 1 to 12 carbon atoms in an amount sufficient to form a thin, tightly adhering, transparent, substantially colorless coating on the glass surface, said glass surface being at a temperature below the pyrolyzing temperature of the said titanium compound.

2. A method as defined in claim 1 wherein the bis(trialkylsiloxy)titanium oxide is dissolved in an inert organic solvent.

3. A method as defined in claim 2 wherein the concentration of the compound is from 0.5% to 10% by weight in an inert volatile organic solvent.

4. A method as defined in claim 1 wherein the glass surface is sprayed with a dilute solution of bis(triethylsiloxy)titanium oxide in benzene.

5. A method as defined in claim 1 wherein bis(trimethylsiloxy)titanium oxide is utilized.

6. A method as defined in claim 1 wherein bis(trihexylsiloxy)titanium oxide is utilized.

7. The method as defined in claim 1 wherein the alkyl group contains from 2 to 6 carbon atoms.

8. A method for imparting scratch and abrasion resistance to glass containers comprising applying to a glass container while at a temperature between room temperature and about 300° F. a bis(trialkylsiloxy)titanium oxide compound wherein the alkyl group contains from 1 to 12 carbon atoms in an amount sufficient to form a thin, tightly adhering, transparent, substantially colorless coating on said surface.

9. A method as defined in claim 8 wherein the compound is bis(triethylsiloxy)titanium oxide.

10. A method as defined in claim 8 wherein the compound is bis(trimethylsiloxy)titanium oxide.

11. The method as defined in claim 8 wherein the compound is bis(trihexylsiloxy)titanium oxide.

12. A method of imparting scratch and abrasion resistance to a glass surface which comprises applying to said surface a bis(trialkylsiloxy)titanium oxide compound wherein the alkyl group contains from 1 to 12 carbon atoms in an amount sufficient to form a thin, tightly adhering, transparent, substantially colorless coating on said surface, the temperature of the glass surface being below the annealing temperature of the glass and below the pyrolyzing temperature of the said titanium compound.

13. A method for imparting scratch and abrasion resistance to a glass surface comprising applying to said surface at room temperature a bis(trialkylsiloxy)titanium oxide compound wherein the alkyl group contains from 1–12 carbon atoms in an amount sufficient to form a thin, tightly adhering, transparent, substantially colorless coating on said surface.

14. An abrasion and scratch resistant glass surface having bonded thereto a layer of a bis(trialkylsiloxy)titanium oxide compound wherein the alkyl groups contain from 1 to 12 carbon atoms in an amount sufficient to form a thin, tightly adhering, transparent and substantially colorless coating thereon.

15. An abrasion and scratch resistant glass container having bonded thereto a layer of a bis(trialkylsiloxy) titanium oxide compound wherein the alkyl group contains from 1 to 12 carbon atoms, in an amount sufficient to form a thin, tightly adhering, transparent and substantially colorless coating thereon.

References Cited

UNITED STATES PATENTS 3,013,993 12/1961 Rust et al.
3,352,708 11/1967 Lyon et al.

ALFRED L. LEAVITT, *Primary Examiner.*

H. COHEN, *Assistant Examiner.*

U.S. Cl. X.R.

65—60